United States Patent [19]
Engler et al.

[11] Patent Number: 5,393,326
[45] Date of Patent: Feb. 28, 1995

[54] PROCESS FOR THE PRODUCTION OF A GAS WITH A SUBSTANTIAL OXYGEN CONTENT

[75] Inventors: Yves Engler, Vincennes; Wilfrid Petrie; Christian Monereau, both of Paris, all of France

[73] Assignee: L'Air Liquide, Societe Anonyme pour l'Etude et l'Exploitation des Procedes Georges Claude, Paris, France

[21] Appl. No.: 94,029

[22] PCT Filed: Nov. 25, 1992

[86] PCT No.: PCT/FR92/01094

§ 371 Date: Jul. 26, 1993

§ 102(e) Date: Oct. 13, 1993

[87] PCT Pub. No.: WO93/10882

PCT Pub. Date: Jun. 10, 1993

[30] Foreign Application Priority Data

Nov. 26, 1991 [FR]  France .................. 91 14545

[51] Int. Cl.[6] ........................ B01D 53/04
[52] U.S. Cl. ........................ 95/103; 95/130
[58] Field of Search ............... 95/101–108, 95/130

[56] References Cited

U.S. PATENT DOCUMENTS

| | | | |
|---|---|---|---|
| 3,226,913 | 1/1966 | Avery | 95/103 X |
| 3,498,025 | 3/1970 | Bednarski | 95/102 |
| 3,720,042 | 3/1973 | Simonet | 95/103 |
| 4,070,164 | 1/1978 | Miwa et al. | 95/101 |
| 4,614,525 | 9/1986 | Reiss | 95/130 X |
| 4,813,977 | 3/1989 | Schmidt et al. | 95/102 |
| 4,892,565 | 1/1990 | Schmidt et al. | 95/101 |
| 5,084,075 | 1/1992 | Sircar | 95/103 X |

FOREIGN PATENT DOCUMENTS

| | | |
|---|---|---|
| 0038410 | 10/1981 | European Pat. Off. . |
| 0082948 | 7/1983 | European Pat. Off. . |
| 0158262 | 10/1985 | European Pat. Off. . |
| 0327732 | 8/1989 | European Pat. Off. . |
| 0451677 | 10/1991 | European Pat. Off. . |
| 1307898 | 2/1973 | United Kingdom . |

*Primary Examiner*—Robert H. Spitzer
*Attorney, Agent, or Firm*—Young & Thompson

[57] ABSTRACT

In a unit for the production of oxygen by separation of air by adsorption with regeneration of the adsorbers (1–5) under vacuum, the sub-atmospheric depressurization is ensured with rejection to the atmosphere by pumping with two successive pumping devices: one, for example of the type of a volumetric compressor (13), operates to a pressure of the order of $0.5 \times 10^5$ Pa absolute, while the other, for example of the type of a centrifugal compressor (14), operates alone to a pressure of the order of $0.2 \times 10^5$ Pa absolute.

5 Claims, 1 Drawing Sheet

PROCESS FOR THE PRODUCTION OF A GAS WITH A SUBSTANTIAL OXYGEN CONTENT

FIELD OF THE INVENTION

The invention relates to a process for the production of a gas with a substantial oxygen content by adsorption of nitrogen from the air and more particularly a process of the type in which, on a plurality "n" of adsorbers, there is successively and cyclically assured according to a period T, in each of the adsorbers, with offset of a time T/n from one adsorber to the next:

a) a production stage of the gas with a substantial content of oxygen by withdrawing gas in a so-called co-current direction at high pressure, with admission of air;

b) a depressurization stage incorporating a terminal phase of pumping counter-current under a sub-atmospheric pressure to the minimum pressure of the cycle, of the order of $0.2 \times 10^5$ Pa absolute;

c) a repressurization stage incorporating a final counter-current repressurization with gas enriched in oxygen;

d) the number of adsorbers and the respective durations of said stages being such that at any time at least two adsorbers will be in the pumping phase of the depressurization stage, at different pressure levels.

BACKGROUND OF THE INVENTION

In this process, to ensure pumping which extends, in the course of a depressurization from atmospheric pressure, or slightly less if an equilibrium is assured between an adsorber at the beginning of repressurization, to a pressure as low as about $0.2 \times 10^5$ Pa absolute, with rejection of a residue to the atmosphere, one utilizes generally volumetric compressors of the "Roots" type, which, if they are suitable to handle high flow rates, accept, at these pressure levels, only relatively small pressure differences between the inlet and the outlet, of the order of $0.5 \times 10^5$ Pa. For higher compression loads, the output of the compressor falls, because one must use two stage volumetric compressors, the second stage being operated in series with the first stage when the pressure has fallen thanks to the first single stage, to a value of the order of $0.5 \times 10^5$ Pa absolute, and one sometimes uses, when the pumped flow rate is great, a multi-stage compressor.

This procedure is therefore burdensome particularly as to energy consumption and has difficulties of embodiment for production units with high flow rates.

SUMMARY OF THE INVENTION

The present invention provides certain arrangements which permit achieving such a depressurization under vacuum in a rapid manner, which is indispensable in this type of use, with the least cost of investment and of energy consumption, and the subject of the invention is achieved, in a process characterized by points a) to d) above, by the combination of the following measures:

e) the pumping phase is subdivided into a plurality of pumping sub-stages, all of the same duration equal to T/n, or to a sub-multiple of T/n, and each pumping sub-stage is associated with a pumping means specific to the conditions of flow rate and pressure variation of said sub-stage;

f) each pumping means is immediately switched with an adsorber at the end of the sub-stage associated with said means, toward an adsorber at the beginning of said sub-stage;

and more particularly, there is provided one or the other of the following arrangements:

1. One pumping means is of the volumetric compressor type for values of pressures higher than a lower limit of the order of $0.5 \times 10^5$ Pa absolute, of the centrifugal compressor type for pressure values comprised between said upper limit and a lower limit of the order of $0.2 \times 10^5$ Pa absolute.

This arrangement permits combining the flexibility of the volumetric compressor as to the inlet pressure level and the excellent output of the centrifugal compressor for higher compression loads.

2. The different pumping means are all of the volumetric compressor type, the pumping means corresponding to any pumping sub-stage except the first sub-stage, comprising an elementary pumping means combined in series and downstream (according to the direction of circulation of the gas) of the pumping means of a pumping sub-stage which immediately precedes it, the number of elemental pumping means corresponding to one pumping sub-stage at a given initial depression being greater by one unit than the number of elemental pumping means associated with the pumping sub-stage which immediately precedes it, and more particularly, in one embodiment, it is provided that the number of pumping sub-stages is two, with two principal pumping means and a single elemental pumping means coupled alternatively to each of said principal pumping means in the course of the last pumping sub-stage.

This arrangement, which as a practical matter leads to the exclusive use of volumetric compressors, for example of the "Roots" type, with a principal compressor to which is added from time to time, at pressures of $0.5 \times 10^5$ Pa absolute or below, one or several other compressors, or a compressor with one or several stages, or one or several multi-stage principal compressors, permits reducing strictly to the minimum the investment costs in rotary machinery.

3. There are as many elemental pumping means as there are pumping sub-stages, the initial pumping sub-stage using said elemental pumping means all connected in parallel, as the case may be in series-parallel, in the course of possible intermediate sub-stages, and in series in the course of the final pumping sub-stage, and more particularly, in an embodiment in which the number of sub-stages is two, with two successive elemental pumping means arranged in parallel, then in series.

Thanks to this arrangement, best use is made of the possibilities of the material used in the sense that there is used for example two pumps connected in parallel when the depression level remains moderate, which permits considerably accelerating evacuation, while the two pumps are connected in series when the underpressure falls below $0.5 \times 10^5$ Pa absolute, which permits operating at a high compression load. The arrangement according to the invention permits an important saving of time to effect the evacuation process or a reduction in the size of the vacuum pump to be installed.

BRIEF DESCRIPTION OF THE DRAWING

The invention will now be described in connection with FIGS. 1 to 3 which show, respectively, first and second embodiments of an installation according to the invention and an embodiment of a pumping group for practicing the process according to the invention.

DETAILED DESCRIPTION OF THE INVENTION

Figure 1:
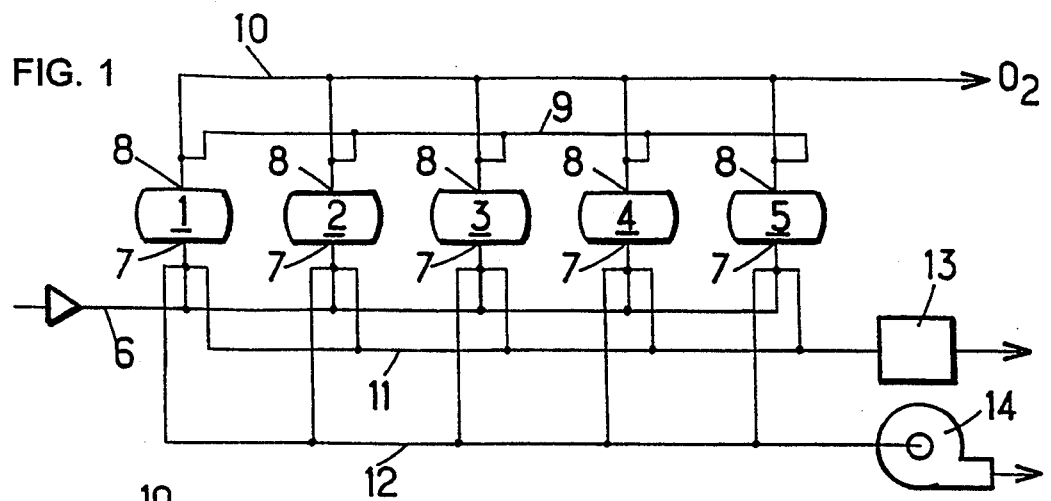

In the embodiment shown in FIG. 1, an installation for the production of a gas with a substantial oxygen content by adsorption of nitrogen uses a plurality $n=5$ of adsorbers 1, 2, 3, 4 and 5, cyclically supplied with compressed air via a conduit 6 connected, by cyclically operating valves (not shown), to the inlets 7 of the adsorbers 1–5, while each production outlet 8 is connected alternatively and cyclically by a set of valves (not shown) either to a balancing conduit 9 between an adsorber at the end of production and/or in the course of initial depressurization and an adsorber at the beginning and/or in the course of repressurization. The outlets 8 are also connected to an oxygen production conduit 10.

The regeneration by depressurization—preferably terminated by a purge-elution with the production oxygen—is operated at sub-atmospheric pressure, and to this end there are provided two evacuation lines from each "inlet" 7 of the adsorbers, one 11 leading to a volumetric compressor 13, the other 12 leading to a centrifugal compressor 14.

During the regeneration operation, each adsorber 1–5 is first subjected to the action of the volumetric compressor 13, via the conduit 11, from atmospheric pressure, or a lower pressure at the end of balancing, to a pressure of the order of $0.5 \times 10^5$ Pa absolute. The volumetric compressor 13 is, depending on the flow rate to be withdrawn, either of a single stage, or of two or more stages.

As soon as the pressure of the order of $0.5 \times 10^5$ Pa is achieved, the adsorber in question is switched with the conduit 12 from which the centrifugal compressor 14 operates particularly to reduce the pressure from 0.5 to $0.2 \times 10^5$ Pa absolute.

In a production unit of this type, the cycle has a predetermined duration T, and the pumping operation of one adsorber a duration equal to T/n, n being the total number of adsorbers, subdivided typically into sub-steps of equal duration (T/2n), such that when one pump 13 (or 14) completes its operation on an adsorber, it will be caused to begin its operation on a following adsorber, such that the pumps 13 and 14 are permanently loaded.

Figure 2:
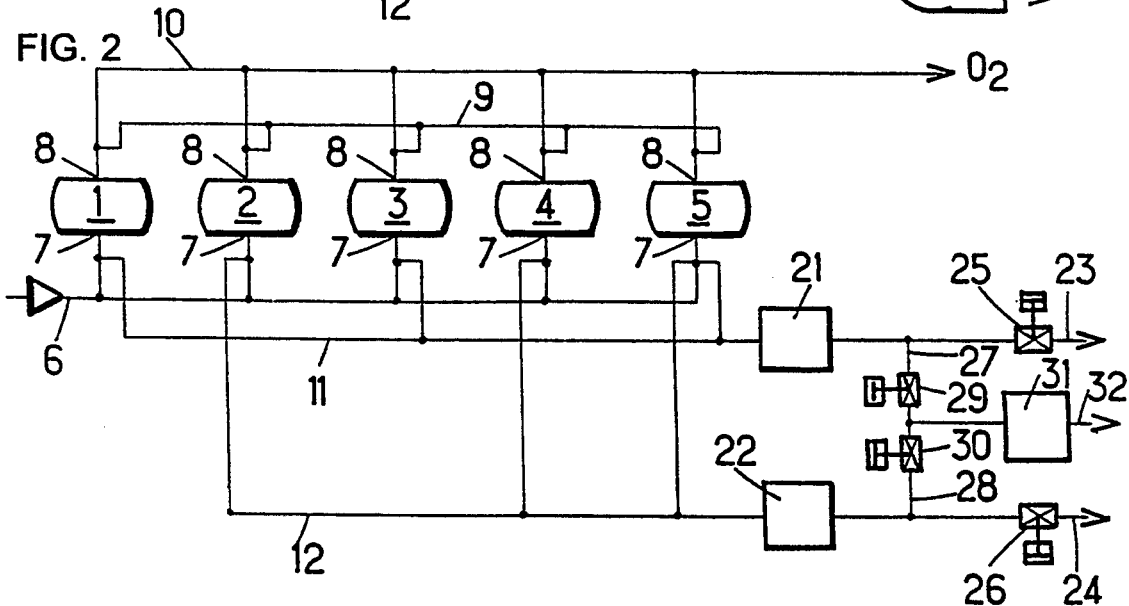

Referring to FIG. 2, an oxygen production unit is similar to that described in FIG. 1, with the differences that the conduits 11 and 12 are each connected to a principal pump 21, 22 of the volumetric compressor type, each emptying into an evacuation conduit to the atmosphere 23, 24 by a valve 25, 26, respectively. Between one pump 21 (22) and its associated valve 25 (26) is provided a branch 27 (28) with a valve 29 (30), the branches both leading to the inlet of another compressor 31, preferably also of the volumetric type, which empties into the atmosphere via an outlet 32, and which generally is the second stage of a plural-stage machine, whose first stage is constituted by the compressor 21 or the compressor 22. It can also be arranged that a same and single rotating machine incorporates three stages of which the first identical two, 21 and 22, are adapted to operate each alone to a depressurization of $0.5 \times 10^5$ Pa absolute, while the third stage 31 is adapted to operate, in series, with one or the other stage 21, 22, to a depressurization to $0.2 \times 10^5$ Pa absolute.

In operation, it will be understood that, in this embodiment, an evacuation conduit 11 is dedicated to one adsorber, while the other evacuation conduit 12 is dedicated to another adsorber, always with a phase offset of T/2n between the evacuation operations in question. The evacuation conduit 11 is first associated with a single pumping stage 21, while the other evacuation conduit 12 is associated with the two pumping stages 22 and 31 arranged in series (valves 25 and 30 open, valves 26 and 29 closed). After a lapse of time of a duration equal to T/2n, at the end of which the conduit 11 is at a pressure of the order of $0.5 \times 10^5$ Pa absolute and the conduit 12 at a pressure of the order of $0.2 \times 10^5$ Pa absolute, the valves are switched (valves 26 and 29 open, valves 25 and 30 close), so that the pumping operations proceed at the level of the conduit 11 on the same adsorber, while an operation at the beginning of pumping is initiated in the following adsorber.

Figure 3:
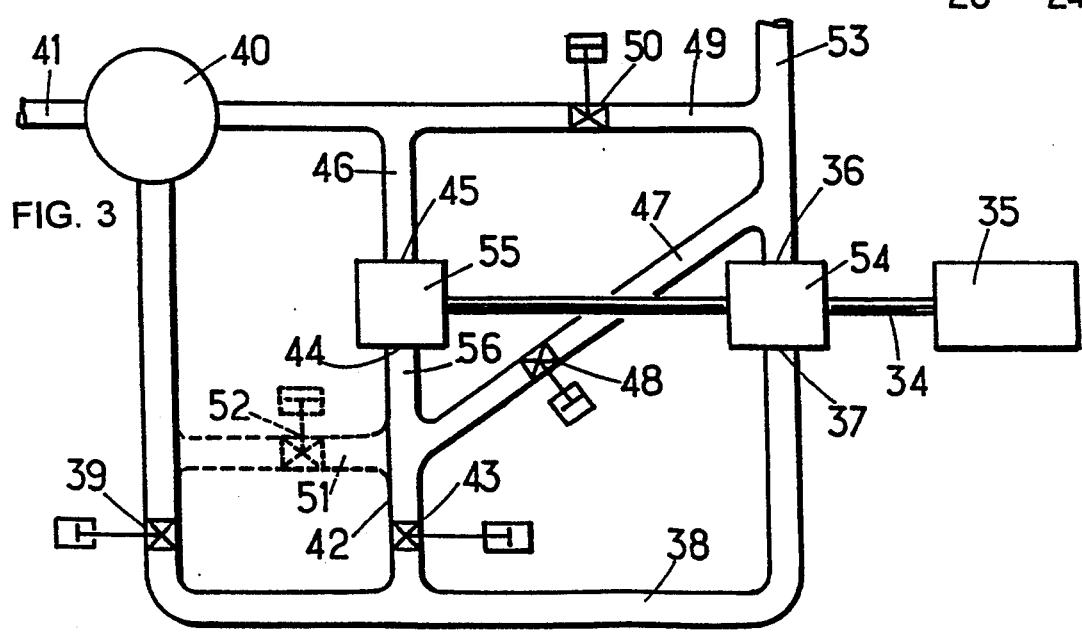

There is shown in FIG. 3 a modified embodiment of a pumping sub-assembly of residues from at least one adsorber via a conduit 53, comprising a two-stage pump (first stage 54, second stage 55) disposed on a drive shaft 34 driven by a motor 35. The first pump stage 54 has its inlet 36 directly connected to the suction conduit 53, while its output 37 is connected, on the one hand by a conduit 38 with a valve 39, to a silencer 40 for discharge to the air at 41, on the other hand, by a conduit 42 with valve 43, to the inlet 44 of the second stage of pump 55, whose output 45 is directly connected by a conduit 46 to the silencer 40. The supply conduit 53 is moreover connected, on the one hand by a conduit 47 with a valve 48 to the inlet 44 of the second stage 55, on the other hand, by a conduit 49 with a valve 50, to the silencer 40. The conduit 42 is itself connected, between valve 43 and inlet 44 of the second stage 55, to a conduit 51 with a valve 52, communicating with the silencer 40 leading to the air.

The operation of this pumping sub-assembly is as follows: at the beginning of pumping, and until a pressure of the order of $0.5 \times 10^5$ Pa is achieved in the residue suction conduit 53, the valves 39 and 48 are open, the valves 50, 43 and 52 are closed, such that the two stages 54 and 55 flow in parallel into the silencer 40, one (54) via the conduit 38, the other (55) being supplied by the conduit 47 and emptying into the conduit 46. A maximum flow rate can therefore be pumped to a depression of the order of $0.5 \times 10^5$ Pa absolute. When a depression of the order of $0.5 \times 10^5$ Pa absolute is achieved, the valves 39 and 48 close, the valve 50 remaining closed, while the valves 43 and 52 open. The residual gases thus survive only at the first stage 54 which supplies them via 38, 43, 42 to the inlet 44 of the second stage 55 which supplies them to the silencer 40 for exhaust into the air. The first and second stages 54, 55 then operate in series and can then easily reach the final pressure of $0.2 \times 10^5$ Pa absolute. It will be noted that their passage through the branch parallel to the branch with a series of pumps 54 and 55 should avoid too great a sub-pressurization of the conduit 56 directly to the inlet of the pump 55. For this purpose, one can for example retard by several tenths of a second the opening of the valve 43 relative to the closing of the valves 48 and 39 or, as the case may be, permit a slight entry of air via the conduit 51 and the open valve 52 during a very short lapse of time.

Although the present invention has been described in relation to particular embodiments, it is not thereby limited but is on the contrary susceptible of modifications and variations which will become apparent to one skilled in the art.

We claim:

1. In a process for the production of a gas with a substantial oxygen content by adsorption of nitrogen from air, with a plurality "n" of adsorbers, wherein there is successively and cyclically assured according to a period T, in each of said adsorbers, with a time offset of T/n, from one adsorber to the next:
   a) a production stage of said gas with a substantial content of oxygen by withdrawal of gas in a direction called co-current at high pressure, with admission of air;
   b) a depressurization stage incorporating a counter-current terminal pumping phase under a sub-atmospheric pressure to a minimum pressure of the cycle, of the order of $0.2 \times 10^5$ Pa absolute;
   c) a repressurization stage incorporating a final counter-current repressurization with a gas enriched in oxygen;
   d) the number of adsorbers (n) and the respective durations of said stages being such that at any moment at least two adsorbers are in the pumping phase of the depressurization stage, at different pressure levels;
   the improvement wherein:
   e) the pumping phase is subdivided into a plurality of pumping sub-stages, all of the same duration equal to T/n, or to a sub-multiple of T/n, and each pumping sub-stage is associated with pumping means specific to the conditions of flow rate and pressure variation of said sub-stage;
   f) each pumping means is immediately switched with an adsorber at the end of the sub-stage associated with said pumping means, to an adsorber at the beginning of said sub-stage.

2. Process according to claim 1, wherein one pumping means is of the type of a volumetric compressor for pressure values higher than a first level of the order of $0.5 \times 10^5$ Pa absolute, and a second pumping means is of the type of a centrifugal compressor (14) for pressure values comprised between said first level and a second level of the order of $0.2 \times 10^5$ Pa absolute.

3. Process according to claim 1, wherein the pumping means are of the type of a volumetric compressor, the pumping means corresponding to any pumping sub-stage, except the initial substage, comprising an elemental pumping means added in series, and downstream, of the pumping means of a pumping substage which immediately precedes it, the number of the elemental pumping means corresponding to a pumping sub-stage at a given initial underpressure being greater by one unit than the number of elemental pumping stages associated with the pumping sub-stage which immediately precedes it, the number of the elemental pumping means corresponding to a pumping sub-stage at a given initial underpressure being greater by one unit than the number of elemental pumping means associated with the pumping sub-stage which immediately precedes it.

4. Process according to claim 3, wherein the number of pumping sub-stages is two, with two first pumping means and a single pumping means coupled alternatively to each of the first pumping means during a final sub-stage of the pumping phase.

5. The process of claim 1, wherein the pumping phase includes at least an initial pumping sub-stage and a final pumping sub-stage, and is carried out with at least two elemental pumping means which are operated in parallel during the initial pumping sub-stage and in series during the final pumping substage.

* * * * *